(12) United States Patent
Danchuk

(10) Patent No.: US 6,189,909 B1
(45) Date of Patent: Feb. 20, 2001

(54) FRICTION-REDUCING SUPPORT MEMBER PROTECTION DEVICE

(76) Inventor: Michael Danchuk, 6705 145th Pl., Jupiter, FL (US) 33418

( * ) Notice: Under 35 U.S.C. 154(b), the term of this patent shall be extended for 0 days.

(21) Appl. No.: 09/280,302

(22) Filed: Mar. 29, 1999

(51) Int. Cl.[7] .................................................. B60P 3/10
(52) U.S. Cl. ................................. 280/414.1; 280/414.2; 280/414.3; 280/32; 414/462; 414/537
(58) Field of Search ........................... 280/414.1, 414.2, 280/414.3, 32; 414/462, 537

(56) References Cited

U.S. PATENT DOCUMENTS

| | | | |
|---|---|---|---|
| 3,567,241 | * | 3/1971 | Foschino ........................... 280/47.32 |
| 3,737,058 | * | 6/1973 | Johnson ................................. 414/537 |
| 3,837,509 | * | 9/1974 | Gladnick ............................... 414/529 |
| 3,917,083 | * | 11/1975 | Carn ...................................... 414/391 |
| 4,327,933 | * | 5/1982 | Tuggle .............................. 280/414.2 |
| 4,429,893 | * | 2/1984 | Palamara .......................... 280/414.1 |
| 4,875,701 | * | 10/1989 | Godbersen ........................ 280/414.1 |
| 5,133,570 | * | 7/1992 | Godbersen ........................ 280/414.1 |
| 5,429,383 | * | 7/1995 | Reed ................................. 280/414.1 |
| 5,431,525 | * | 7/1995 | Scott ..................................... 414/538 |
| 5,542,810 | * | 8/1996 | Florus .................................. 414/538 |
| 5,560,713 | * | 10/1996 | Christenson ........................... 384/42 |
| 5,664,516 | * | 9/1997 | Breeden .............................. 114/259 |
| 5,934,863 | * | 8/1999 | Beck ..................................... 414/538 |
| 5,993,063 | * | 11/1999 | Stewart ................................. 384/42 |

* cited by examiner

Primary Examiner—Brian L. Johnson
Assistant Examiner—Deanna Draper
(74) Attorney, Agent, or Firm—McHale & Slavin

(57) ABSTRACT

A watercraft trailer support skid protection assembly includes a protective sleeve sized and shaped to fit the contoured free end of an existing watercraft support skid. The assembly includes a securing device to hold the sleeve in place on the proximal end of the support skid. The protective sleeve has a low coefficient of friction and cooperates with the main support portion of the support skid. The assembly ensures that a watercraft will be securely held in place during transit, while promoting ease of loading and unloading, when appropriate. In an alternate embodiment of the assembly, the protective sleeve is used as a capping member to protect the contact faces of support bunks associated with a watercraft lifting device.

4 Claims, 2 Drawing Sheets

FRICTION-REDUCING SUPPORT MEMBER PROTECTION DEVICE

FIELD OF THE INVENTION

This invention is directed to watercraft support devices, and, in particular, to a friction-reducing protection assembly mountable on the free ends of watercraft support members.

BACKGROUND OF THE INVENTION

For many individuals, a trailer pulled behind a truck or car provides an effective tool for transporting a watercraft to and from a body of water for use. Ideally, the trailer is designed to help with the watercraft loading and unloading tasks, as well.

Many types of trailers have been developed in an attempt to ease the boat loading and launching process. Some trailers include a collection of rollers over which a watercraft is rolled during loading and unloading. In theory, the rollers collectively provide a low-friction support surface that allows a boat to move off a trailer, for use in the water, or onto the trailer, for transportation and storage. In actual practice, however, rollers have several drawbacks. Because only a small amount of any given roller contacts the watercraft hull, the rollers tend to develop flat spots, over time. These flat spots reduce the efficiency of a given roller and can produce hull indentations as a watercraft moves across the damaged roller. Additionally, when used in a marine environment, rollers often require increased maintenance to prevent hardware corrosion that would prevent the roller from freezing in place of "seizing up." Rollers that have "seized up" do not roll correctly and actually increase the effort required to move a watercraft onto or off of a given trailer. U.S. Pat. No. 3,785,677, for example, discloses such a roller-type trailer.

Other trailers employ skids/bunks that have lots of bunks or skids to support a watercraft. The skids are typically elongated planks of wood or metal; the skids are often covered with a carpet-like material to reduce hull damage during loading and unloading. Trailers that use skids have several advantages over roller-only trailers, but the use of skids presents disadvantages, as well. Unlike roller-only trailers, trailers that employ skids typically present a relatively-large surface with which to support a watercraft hull. The increased surface reduces point loading on a given watercraft hull, thereby reducing the likelihood of hull damage as the boat is transported from place to place. Unfortunately, the increased amount of contact surface area brings a concomitant increase in friction, making maneuvering a watercraft onto or off of the trailer difficult. Additionally, the skid-covering carpet tends to deteriorate quickly with continued use. And although skids with deteriorated coverings may still support a watercraft, worn spots increase sliding friction and can permanently damage watercraft hulls. Skid-employing trailers often trade one set of problems for another. U.S. Pat. Nos. 3,203,563; 3,122,245; 3,228,543 disclose trailers that use bunks or skids.

Other trailers have been designed to address the problems presented by roller-only and carpeted skid trailers. U.S. Pat. No. 5,002,299, for example, discloses a trailer that employs a collection of slick "glides" to support a watercraft. The glides include hull-contacting surfaces made from low-friction material designed to allow ease of watercraft movement during loading and unloading. Unfortunately, the slick nature of the glides can present a safety issue. In many cases, especially with lighter watercraft, including so-called jet-boats and jet-skis, the watercraft is not held securely during transit. In these cases, the relatively-low weight of the craft does not generate enough downward force to keep the watercraft securely in place on the skids. As a result, the watercraft is easy to load and unload, but may shift dangerously during transit. Larger watercraft present concerns, as well. The inherently-high momentum imparted to large watercraft make glide-employing trailers dangerous. For example, during sudden turns or emergency stopping, the heavy watercraft will tend to continue moving straight ahead, even though the trailer may be stopping or moving along a curved path. While low-friction glides may ease watercraft loading and unloading, their use can be dangerous.

Thus, what is needed is a low-friction, watercraft trailer skid protection device that includes advantages of the known devices, while addressing the shortcomings they exhibit. The protection device should cooperate with existing portions of a trailer to allow a watercraft to be loaded and unloaded easily, while ensuring that the watercraft is held securely during transit. The protection device should not only protect watercraft hulls, but also should protect support skids from becoming worn down with use. The device should allow the protected support skids to dry quickly and should be attached in a manner that allows the device to be removed for replacement or maintenance, if necessary. The device should also be non-corrosive and suitable for use in a marine environment.

SUMMARY OF THE INVENTION

The present invention is a low-friction, watercraft trailer skid protection device. The device includes a protective sleeve that fits the contours of a trailer support skid free end. The device of the present invention may be used in pairs to protect the ends of several skids on a given trailer.

The protective sleeve includes a beveled main contact panel that guides a watercraft onto, and off of, a conventional support skid. The protective sleeve also includes front and side panels that help maintain the sleeve in a desired orientation on the skid. Threaded attachment screws hold the protective sleeve in place and allow the sleeve to be removed for maintenance or replaced, if necessary.

In an alternate embodiment, the present invention may be used as a capping member for contact faces of boat lift bunks.

Thus, an objective of the instant invention is to provide a low-friction, watercraft trailer skid protection device that allows a watercraft to be loaded and unloaded easily, while ensuring that the watercraft is held securely during transit.

An additional objective of the instant invention is to provide a low-friction, watercraft trailer skid protection device that not only protects watercraft hulls, but also protects support skids from becoming worn down with use.

Yet another objective of the instant invention is to provide a low-friction, watercraft trailer skid protection device that allows protected support skids to dry quickly.

A further objective of the instant invention is to provide a low-friction, watercraft trailer skid protection device that is attached in a manner that allows the device to be removed for replacement or maintenance, if necessary.

Yet an additional objective of the instant invention is to provide a low-friction, watercraft trailer skid protection device is that is non-corrosive and suitable for use in a marine environment.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
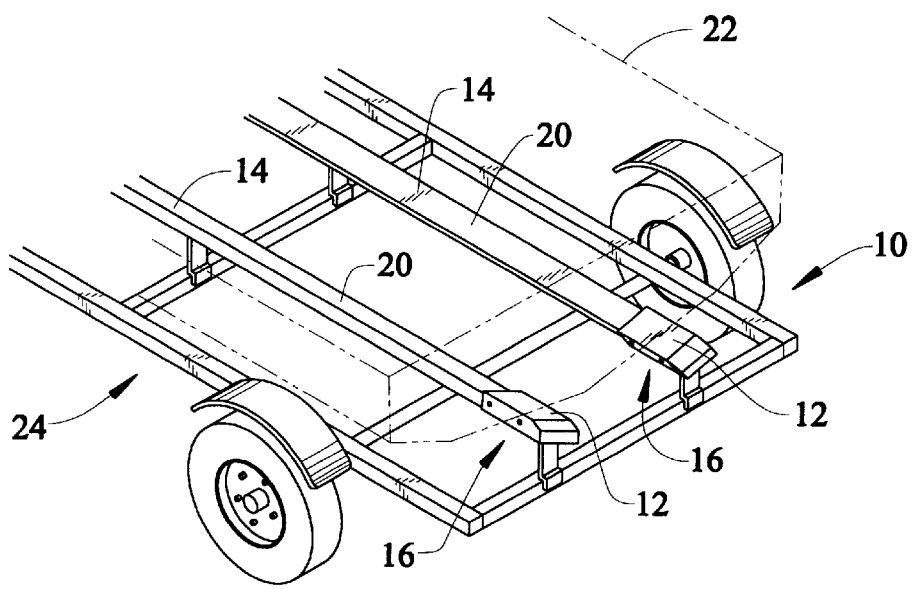
FIG. 1 is a pictorial view of the friction-reducing protection device of the present invention, shown in use on watercraft trailer skids.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now with reference to FIG. 1, the friction-reducing skid protection device 10 of the present invention is shown. By way of overview, the protection device 10 includes a smooth protective sleeve 12 that follows the outside contours of a conventional watercraft trailer watercraft support skid 14. The device 10 includes a securing means 16 that maintains the sleeve 12 in a desired location at the end of the watercraft support skid 14. The protective sleeve 12 has a low coefficient of friction. A preferred material for the protective sleeve is plastic, although other low-friction materials may suffice. The protective sleeve 12 cooperates with the main support portion 20 of the support skid 14 which has a relatively-higher degree of friction. With this arrangement, a supported watercraft 22 will be held securely on an associated trailer 24 during transit, yet be easy to load and unload when appropriate. In a preferred embodiment, two protective sleeves 12 are used, one secured on each of two skids 14 associated with a given trailer 24. The skid protection device 10 will now be discussed in detail.

With continued reference to FIG. 1, the contoured protective sleeve 12 is shaped to partially surround a proximal free end 26 of a watercraft support skid 14 included employed on a conventional watercraft trailer 24. With additional reference to FIG. 2, the protective sleeve 12 is essentially a modified rectangular shell. The sleeve 12 is characterized by a beveled main contact panel 28 that lies against the watercraft-facing surface 30 of the support skid 14. The main contact panel 28 includes a sloped entry face 29 angled to direct a watercraft 22 onto and off of the trailer 24. The sleeve also includes a first side panel 32, a second side panel 34, and a front panel 36. The side and front panels 32,34,36 extend downward from the main contact panel 28. The first and second side panels 32,34 extend respectively from a first side edge 38 and a second side edge 40 of the main contact panel 20. The front panel 36 extends along a main contact panel front edge 42 and spans between the side panels 32,34. The side panels 34,36 and the front panel 36 cooperate to help position the main contact panel 28 against the watercraft facing surface 30 of the support skid 14.

Although the protective sleeve 12 may be produced with five sides, the modified-four-sided arrangement described above is preferred and provides improved drainage. As a result, the four-sided sleeve 12 promotes quick drying and reduces the tendency of the skid proximal end 26 to rot or corrode. Additionally, the sleeve 12 need not be rectangular; other cross sections are possible, if desired or dictated by the contours of a given support skid 14.

Figure 2:
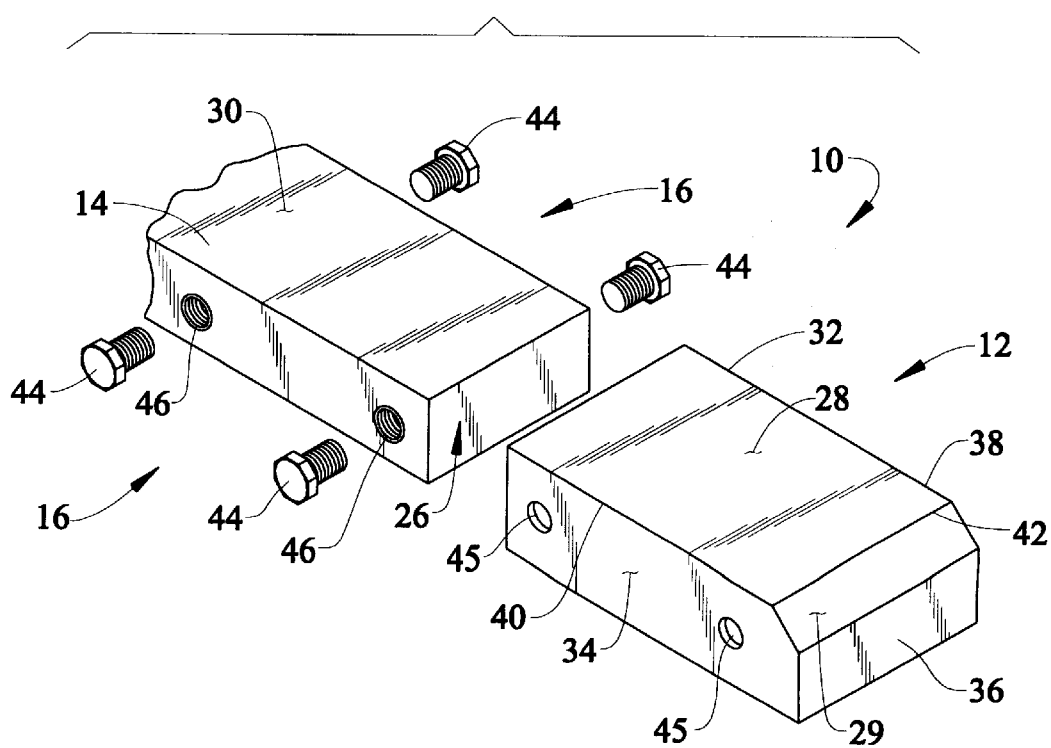
FIG. 2 is an exploded view of the protection device shown in FIG. 1.

With continued reference to FIG. 2, the skid protection device 10 includes attachment screws 44 that act as a securing means to hold the protective sleeve 12 in place on the proximal end 26 of the support skid 14. With reference to FIG. 2, the attachment screws 44 extend into the support skid 14, via passthrough apertures 45 disposed within the protective sleeve 12. Use of screws 44 allows removal of an attached protective sleeve 12 to be removed for replacement as needed. This arrangement also allows access to the proximal end 26 of the support skid 14, thereby allowing maintenance of the entire skid, if necessary.

Although the preferred securing means 16 employs attachment screws 44, the screws may be supplemented by, or replaced with, adhesive disposed between the mating surfaces of the protective sleeve 12 and the support skid 14. Relatively-permanent fasteners including, but not limited to, rivets, nails, or staples, not shown, may also be used. Threaded receiving sleeves 46 may also be disposed within the proximal end 26 of the support skid 14, thereby facilitating repeated insertion and removal of the attachment screws 44, as needed.

Figure 3:
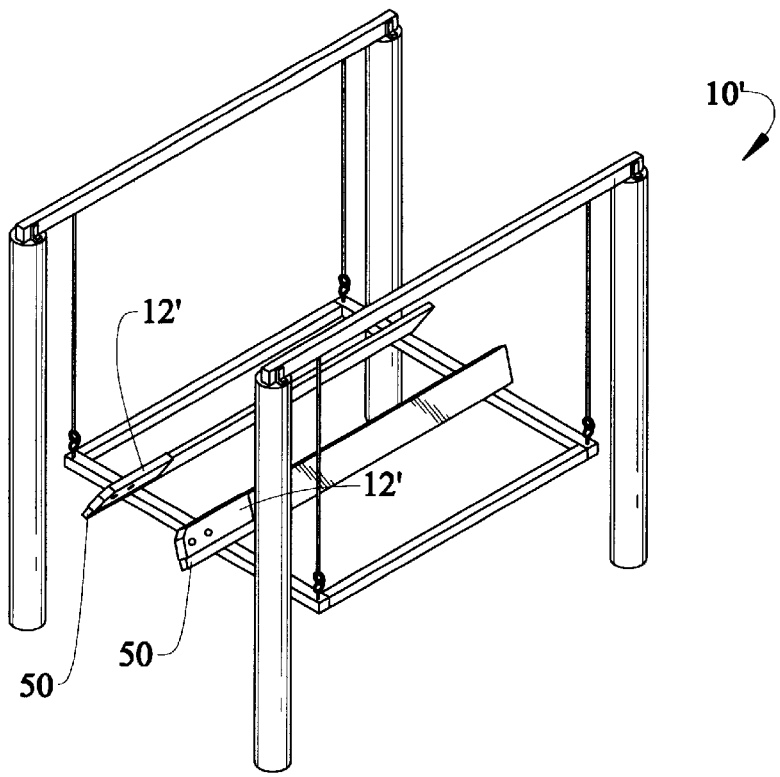
FIG. 3 is a pictorial view of an alternate embodiment of the friction-reducing protection device of the present invention, shown in use as a capping member on watercraft lift support bunks.
Figure 4:
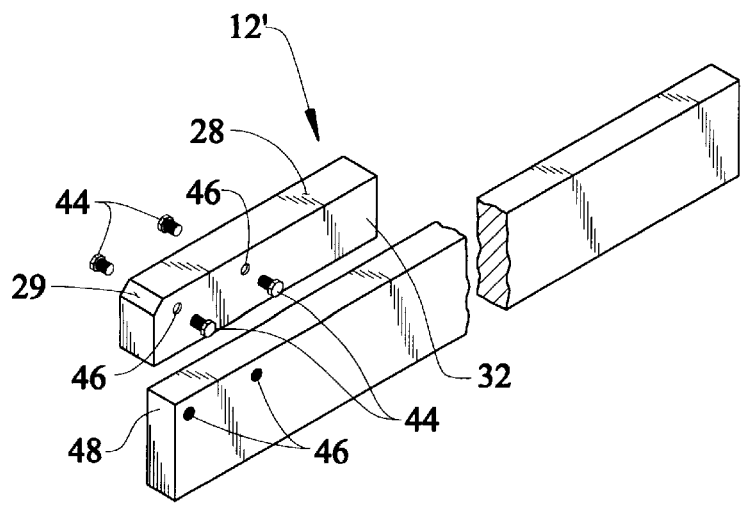
FIG. 4 is an exploded view of the protection device shown in FIG. 3.

In an alternate embodiment, shown in FIGS. 3 and 4, the protection device 10' is used with an existing watercraft lift device 52. In the alternate embodiment 10', modified protective sleeves 12' may be used as capping members mounted on the contact faces 48 of watercraft lift support bunks 50. In this embodiment, the sleeves 12' may be four-sided members. The securing means 16' of the alternate embodiment 10' is similar to the securing means 16 of the primary embodiment 10. That is, the alternate embodiment 10' employs attachment screws 44 to keep the protective sleeve 12' in place. As with the primary embodiment 10, the screws 44 may be supplemented by, or replaced with, adhesive. Additionally, receiving sleeves 46 may be used to facilitate repeated insertion and removal of the attachment screws 44. Relatively-permanent fasteners including, but not limited to, rivets, nails, or staples, not shown, may also be used to secure the sleeves 12'. Although the alternate embodiment 10' has been described as including a four-sided protective sleeve 12', other configurations are possible, in accordance with the shape of the support bunk 50 used and the type of drainage required.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A skid protection assembly adapted for attachment to a free end of a trailer skid member, said assembly comprising a smooth elongated channel shaped shell adapted to conform to the shape of said free end of said skid, said channel shaped shell composed of a low coefficient of friction plastic material, said channel shaped shell having an elongated intermediate main contact panel integrally formed with elongated side walls depending from each side of said main contact panel, said channel shaped shell having an open end and an integral end wall spaced therefrom, said end wall joining said main contact panel and said depending walls closing said channel shaped shell, said end wall having a sloped wall portion extending outwardly from said main contact panel for spacing the end of the skid from the closed end wall of said channel shaped shell, the spacing adapted to provide cushioning and air circulation, and a securing means for maintaining said sleeve in a preferred orientation on said free end.

2. The skid protection assembly of claim 1 wherein said main contact panel and said end wall are imperforate and said securing means includes apertures in said integral side walls adapted to engage selectively removable fasteners.

3. The skid protection assembly of claim 2 wherein said free end of said skid has apertures formed therein to cooperate with said apertures in said sleeve when said sleeve is secured to said skid, said protection assembly including threaded sleeves adapted to be inserted in each of said apertures of said skid, and threaded fasteners for insertion through said side walls and said skids.

4. The skid protection assembly of claim 1 wherein said main contact panel includes a beveled entry face.

\* \* \* \* \*